May 16, 1967
C. O. BLISS
3,319,677
JUICER CONSTRUCTION
Filed Nov. 13, 1964
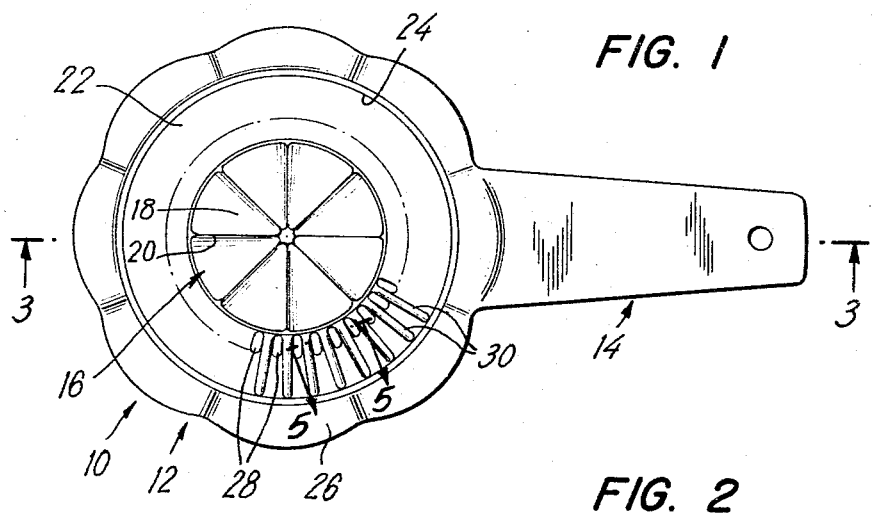
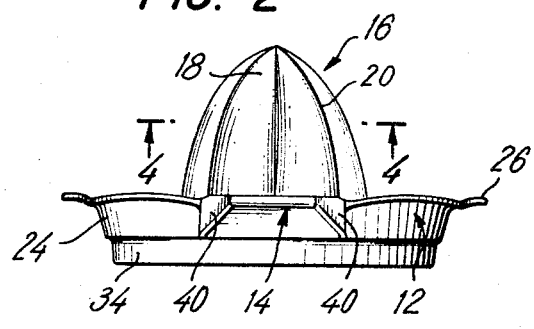
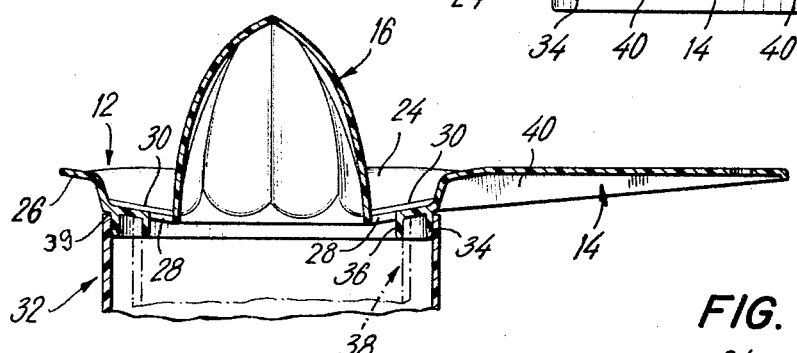
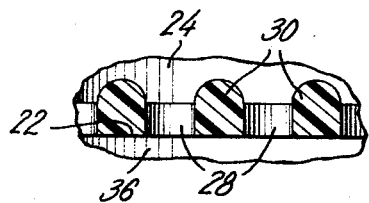
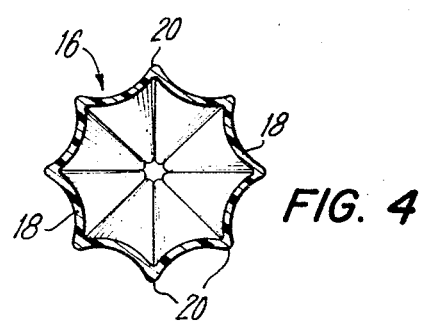
INVENTOR
CHARLES O. BLISS
BY *Harry Cohn*
ATTORNEY

United States Patent Office 3,319,677
Patented May 16, 1967

3,319,677
JUICER CONSTRUCTION
Charles O. Bliss, Los Angeles, Calif.; Beatrice Bliss, executrix of said Charles O. Bliss, deceased, assignor to Blisscraft of Hollywood, Gardena, Calif.
Filed Nov. 13, 1964, Ser. No. 410,945
2 Claims. (Cl. 146—3)

This invention relates to devices known as juicers or reamer devices, i.e. articles for extracting juice from oranges and other citrus fruits.

One object of the invention is to provide a juicer which can be readily molded in one piece from a suitable plastic, for example but without limitation, nylon.

Another object is to provide a juicer adapted to be supported by and fit onto the top of a pitcher or other receptacle.

A further object is to provide a molded plastic juicer which is of rugged construction without being excessively thick.

A yet further object is generally to provide a molded plastic juicer which is durable and effective for its function.

The above and other objects, features and advantages of the invention will be fully understood from the following description of the presently preferred embodiment of the invention, considered in connection with the accompanying illustrative drawings:

In the drawings:

FIG. 1 is a top plan view of a juicer in accordance with the invention;

FIG. 2 is a right hand end view thereof;

FIG. 3 is a sectional view on the line 3—3 of FIG. 1;

FIG. 4 is a horizontal sectional view of the reamer part of the juicer on the line 4—4 of FIG. 2; and FIG. 5 is a fragmentary sectional view, on an enlarged scale, on the line 5—5 of FIG. 1.

Referring now to the drawings in detail, the juicer 10 which is molded in one piece from nylon or other suitable plastic comprises the dish-like part 12, provided preferably with a handle 14, and a reamer member 16 upstanding from part 12. Reamer member 16 tapers upwardly from dish-like part 12 and has a plurality of concave portions 18 which terminate in ribs 20 which augment the juice squeezing action when the fruit is pressed downwardly against reamer member 16 and turned about the vertical axis of said member as will be readily understood.

The dish-like part comprises a bottom 22, a peripheral rim or side wall 24, and a peripheral horizontal flange 26. The bottom 22 is provided with a plurality of juice outlet openings or small apertures 28 which are disposed in circumferentially spaced relation adjacent the bottom of reamer member 16, preferably completely therearound. As the apertures 28 are small, the bottom 22 serves as a juice strainer by retaining the fruit pulp therein. Radially extending ribs 30 are integral with the bottom 22 of the juicer in position between adjacent openings 30. Said ribs extend from the base of reamer member 16 beyond apertures 28 to side wall 24, and impart added strength to bottom 22 in counteracting the force of the juice-squeezing action, whereby the dish-like member 12 can be relatively thin and thereby require the use of a relatively small quantity of plastic for its manufacture.

As illustrated by FIG. 3, the juicer is removably mounted on the top of a juice receptacle, for example, as a pitcher 32 to receive the strained juice directly as it is squeezed from the fruit. Dish-like part 12 is provided with radially spaced integral flanges 34 and 36 of circular contour which depend from bottom 22. As here shown, the outer flange is positioned to press fit in the top of pitcher 32 and inner flange 36 is positioned to press fit into a pitcher 38 of smaller diameter. The peripheral shoulder 39 on the bottom 22 engages the top edge of the receptacle when the juicer is supported on the larger pitcher. When the juicer is used with a bowl, cup, or other receptacle which is of larger diameter than pitcher 32, said juicer can be supported on the top edge of such receptacle by resting flange 26 on said edge, and if such receptacle is wider than said flange, the handle 14 or and the part of flange 26 diametrically opposite the inner end of handle 14 can be used to support the juicer on the receptacle. Handle 14 preferably has side flanges 40 which strengthen the handle for its juicer supporting function.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A moulded plastic juicer comprising:
   a concave upwardly annular bottom portion;
   a peripheral, upwardly directed, side wall, integral with the outer part of said bottom portion;
   a downwardly concave reamer, integral with and upstanding from the central part of said bottom portion;
   a plurality of radially spaced apart, concentric, downwardly directed, annular walls, integral with an intermediate part of said bottom portion, the innermost of said downwardly directed walls being radially spaced from said reamer;
   a plurality of angularly spaced apart ribs formed integrally into said bottom portion, extending between and integral with said reamer and said peripheral side wall, and thicker than the remainder of said bottom portion;
   a plurality of radially elongated apertures through said bottom portion, each formed between two respectively adjacent ribs, and extending between said reamer and said innermost downwardly directed wall;
   whereby said juicer can be supported on top of a larger receptacle by resting said bottom portion thereon with at least said innermost downwardly directed wall disposed within and concentric with such a receptacle, and juice can pass from the upper, outer surface of said reamer through said apertures into such a receptacle, said ribs serving to strengthen said bottom portion against the forces resulting from the fruit squeezing action of said reamer.

2. A juicer according to claim 1 further including:
   a substantially horizontally directed, annular wall, integral with and extending from said peripheral side wall;
   said horizontally directed wall including a radially elongated part serving as a handle;
   whereby said juicer can be supported on top of a relatively larger receptacle by resting said horizontally directed wall including said handle part thereon, with said bottom portion within such relatively larger receptacle.

References Cited by the Examiner

UNITED STATES PATENTS

| 438,069 | 10/1890 | Easley | 146—3.5 |
| 1,327,929 | 1/1920 | Tripke. | |
| 2,540,500 | 2/1951 | Waggoner | 146—3.4 |
| 2,701,593 | 2/1955 | Dootson | 146—3.4 |

DONALD R. SCHRAN, *Primary Examiner.*